United States Patent
Olbrich et al.

(10) Patent No.: US 8,795,509 B2
(45) Date of Patent: Aug. 5, 2014

(54) PROCESS FOR PRODUCING PURE AMMONIUM PERRHENATE

(75) Inventors: Armin Olbrich, Seesen (DE); Matthias Jahn, Goslar (DE); Juliane Meese-Marktscheffel, Goslar (DE); Ruediger Zertani, Goslar (DE)

(73) Assignee: H. C. Starch GmbH, Goslar (DE)

( * ) Notice: Subject to any disclaimer, the term of this patent is extended or adjusted under 35 U.S.C. 154(b) by 911 days.

(21) Appl. No.: 12/996,016

(22) PCT Filed: Apr. 29, 2009

(86) PCT No.: PCT/EP2009/055174
§ 371 (c)(1),
(2), (4) Date: Jan. 26, 2011

(87) PCT Pub. No.: WO2009/146986
PCT Pub. Date: Dec. 10, 2009

(65) Prior Publication Data
US 2011/0123709 A1 May 26, 2011

(30) Foreign Application Priority Data

Jun. 5, 2008 (DE) .......................... 10 2008 026 910

(51) Int. Cl.
| | |
|---|---|
| *C25B 1/00* | (2006.01) |
| *C25B 1/22* | (2006.01) |
| *C25B 1/28* | (2006.01) |
| *C01G 47/00* | (2006.01) |
| *C02F 1/68* | (2006.01) |

(52) U.S. Cl.
USPC .......................................... 205/551; 210/749

(58) Field of Classification Search
CPC .............. C25B 1/00; C25B 1/22; C25B 1/28; C01G 47/00; B01D 2311/2684; B01D 15/362; C02F 1/68

USPC .......................................... 205/551; 210/749
See application file for complete search history.

(56) References Cited

U.S. PATENT DOCUMENTS 6,039,920 A    3/2000  Koch et al.

FOREIGN PATENT DOCUMENTS

| AT | 292 629 B | 9/1971 |
| DE | 1 185 167 B | 1/1965 |

(Continued)

OTHER PUBLICATIONS pdf document of website archive generated using WayBack Machine.*

(Continued)

*Primary Examiner* — Edna Wong
(74) *Attorney, Agent, or Firm* — Norman B. Thot

(57) ABSTRACT

A process for preparing a pure ammonium perrhenate includes producing a first aqueous suspension containing an ammonium perrhenate. A stoichiometric amount of a nitric acid is added to the first aqueous suspension so as to produce a second suspension. The second suspension is introduced into a cathode space of an electrolysis cell. The electrolysis cell is divided by a cation-exchange membrane into the cathode space and an anode space. The nitric acid is cathodically reduced to a nitrous acid in the cathode space by applying an electric potential. The nitrous acid is reacted with ammonium ions of the ammonium perrhenate so as to form an aqueous perrhenic acid. Potassium ions are removed from the aqueous perrhenic acid. At least a stoichiometric amount of ammonia is added to the aqueous perrhenic acid so as to produce the pure ammonium perrhenate.

14 Claims, 3 Drawing Sheets

(56) References Cited

FOREIGN PATENT DOCUMENTS

| DE | 2005 66 A1 | 5/1983 |
| DE | 198 11 765 A1 | 11/1998 |
| EP | 0 512 633 A | 11/1992 |

OTHER PUBLICATIONS

Kertes et al., "Solvent-extraction of Septivalent Rhenium. Part I. Heterogeneous Equilibria in the System, Aqueous Nitric Acid-Potassium Perrhenate-Tributyl Phosphate", Journal of the Chemical Society (Resumed) [no month, 1961], pp. 1921-1926.*

Agapova et al., "Chemical and Electrochemical Oxidation of Organic Compounds in Rhenium Containing Solutions", Kompleksnoe Ispol'zovanie Mineral'nogo Syr'ya (no month, 1999), No. 2, pp. 23-30. Abstract Only.*

Palant et al., "Production of the High Purity NH4ReO4 Using Electrodialysis Method", 7th International Symposium on Technetium and Rhenium—Science and Utilization—Moscow (no month, 2011), p. 119.*

Ullmann's Encyclopedia of Industrial Chemistry, Fifth Edition, vol. A23: "Rhenium and Rhenium Compounds", VCH Verlagsgesellschaft mbH, pp. 202-204, ISBN 3-527-20123-8 (1993).

Leszczynska-Sejda et al., "Synthesis of perrhenic acid using ion exchange method", Hydrometallurgy, vol. 89, pp. 289-296 (2007).

A. V. Elutin et al., "Usage of Electrodialysis Method for Preparing High-Purity Rhenium Chemical Compounds", Rhenium and Rhenium Alloys, B.D. Bryskin Editor, The Minerals, Metals & Materials Society, pp. 209-215 (1997).

A. A. Palant et al., "Electrochemical production of concentrated solutions of rhenium acid under the effect of alternative current with commercial frequency", Database Compendex [Online] Engineering Information, Inc., New York, NY, US, Database Accession No. E2005439432862 Abstract, Tsvetnye Metally 2005 Ruda I Metally Ru, No. 5-6, pp. 128-130 (2005).

A. A. Patlant et al., "Electrochemical production of concentrated solutions of rhenium acid under the effect of alternative current with commercial frequency", Tsvetnye Metally 2005 Ruda I Metally Ru, No. 5-6, pp. 128-130 (2005).

\* cited by examiner

PROCESS FOR PRODUCING PURE AMMONIUM PERRHENATE

CROSS REFERENCE TO PRIOR APPLICATIONS

This application is a U.S National Phase application under 35 U.S.C. §371 of International Application No. PCT/EP2009/055174, filed on Apr. 29, 2009, and which claims benefit to German Patent Application No. 10 2008 026 910.7, filed on Jun. 5, 2008. The International Application was published in German on Dec. 10, 2009 as WO 2009/146986 A1 under PCT Article 21(2).

FIELD

The present invention provides a process for preparing pure ammonium perrhenate by reacting perrhenic acid with ammonia. The present invention also provides high-purity ammonium perrhenate.

BACKGROUND

Ullmann's Encyclopedia of Industrial Chemistry, 5th edition, vol. 23, pages 202-203, describes a process for preparing pure perrhenic acid by firstly thermally decomposing a technical-grade ammonium perrhenate under nitrogen to form rhenium dioxide. The rhenium dioxide is subsequently converted thermally, with addition of oxygen and water, into pure perrhenic acid. Pure ammonium perrhenate is then prepared directly therefrom by means of ammonia.

The conversion of rhenium dioxide into perrhenic acid occurs via volatile dirhenium heptoxide ($Re_2O_7$) which is formed as an intermediate and on introduction into water or cocondensation together with water forms perrhenic acid. When the above-described process is employed, typical cationic impurities such as, for example, alkali metals or transition metals in technical-grade ammonium perrhenate remain as nonvolatile alkali metal perrhenates or heavy metal perrhenates in the sublimation residue such that the purification method should be very effective. However, this only applies with the proviso that no transfer of the starting material or of the residue into the receiver in which the perrhenic acid is collected can occur. The latter can be achieved only with great difficulty under practical conditions. This fact is also why the preceding decomposition of the technical-grade ammonium perrhenate into rhenium oxide is necessary. Virtually all impurities in ammonium perrhenate, both cationic and anionic in nature, can be removed by (multiple) recrystallization. An exception is potassium which cannot be removed from the ammonium perrhenate by the last-named process.

The process described in the prior art for preparing pure perrhenic acid is concerned virtually exclusively with the removal of this element. This process comprises two thermal stages and is therefore very complicated.

In "Hydrometallurgy", vol. 89 (2007), pages 289-296, Leszczynska-Sejda et al. describe a process for preparing perrhenic acid via an ion-exchange process. Here, ammonium perrhenate solutions are converted into perrhenic acid by cation exchange. The resulting purity of the perrhenic acid is relatively good. However, the exchange process described is quite complicated and the exchange cycles must be carried out a large number of times in order to obtain sufficiently ammonium-free perrhenic acid. Furthermore, the perrhenic acid initially obtained using the best-suited ion exchanger has a very low rhenium concentration of about 17 g/l. To obtain concentrated rhenic acid having about 300 g of rhenium per liter, it is necessary to concentrate the dilute acid by evaporation of the large excess of water. To avoid considerable losses of rhenium, this must be carried out at 60° C. in a vacuum evaporator.

SUMMARY

An aspect of the present invention is to provide a simple process for preparing a pure ammonium perrhenate, which process has a high space-time yield and which requires less energy so that it is more environmentally friendly compared to conventional processes.

In an embodiment, the present invention provides a process for preparing a pure ammonium perrhenate which includes producing a first aqueous suspension containing an ammonium perrhenate. A stoichiometric amount of a nitric acid is added to the first aqueous suspension so as to produce a second suspension. The second suspension is introduced into a cathode space of an electrolysis cell. The electrolysis cell is divided by a cation-exchange membrane into the cathode space and an anode space. The nitric acid is cathodically reduced to a nitrous acid in the cathode space by applying an electric potential. The nitrous acid is reacted with ammonium ions of the ammonium perrhenate so as to form an aqueous perrhenic acid. Potassium ions are removed from the aqueous perrhenic acid. At least a stoichiometric amount of ammonia is added to the aqueous perrhenic acid so as to produce the pure ammonium perrhenate.

BRIEF DESCRIPTION OF THE DRAWINGS

The present invention is described in greater detail below on the basis of embodiments and of the drawings in which.

DETAILED DESCRIPTION

The present invention is based on the recognition that nitrite ions produced cathodically from nitrate ions react with ammonium ions to form water and molecular nitrogen and a suspension of ammonium perrhenate can in this way be converted in the presence of nitric acid into a concentrated perrhenic acid solution.

For the purposes of the present invention, technical-grade ammonium perrhenate is an ammonium perrhenate ($NH_4ReO_4$) which contains impurities such as K, Na, Ca, Mg, Fe, Cu, Mo, Si in amounts of up to 100 ppm and more. A particularly undesirable impurity in the ammonium perrhenate and in the end products produced therefrom, such as perrhenic acid, rhenium oxides ($ReO_2$, $ReO_3$) and rhenium metal, is potassium.

Depending on the potassium content of the rhenium-containing starting materials, a particular proportion of the potassium can be removed as insoluble potassium perrhenate from the concentrated perrhenic acid.

In the process of the present invention, the suspension containing ammonium perrhenate is admixed with a stoichiometric amount of nitric acid and subsequently introduced into the cathode space of an electrolysis cell divided by a cation-exchange membrane into a cathode space and an anode space.

Figure 1:
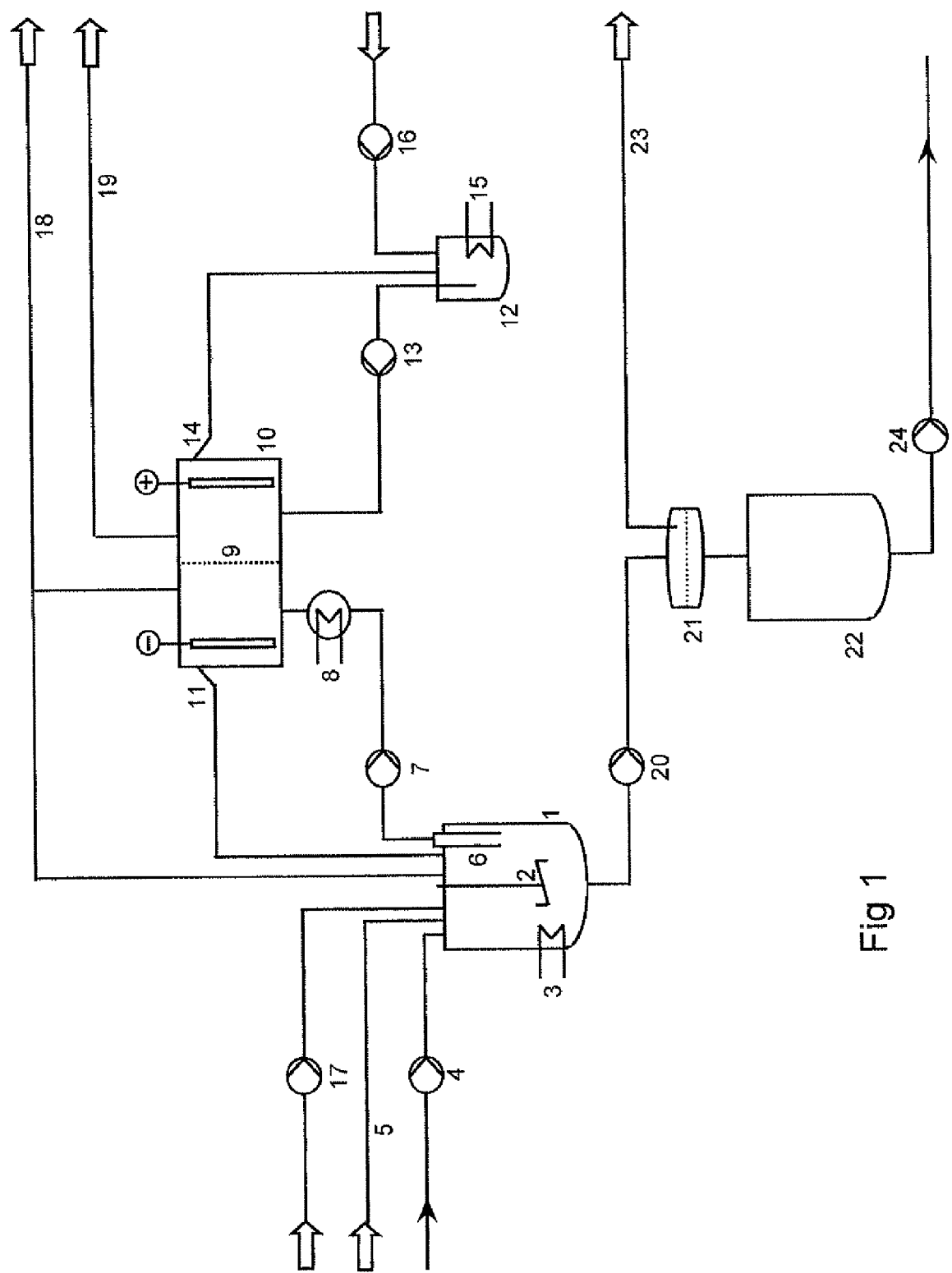
FIG. 1 shows a schematic of the electrolysis cell (10)

The electrolysis cell (10) is shown schematically in FIG. 1. As cation-exchange membrane, it is possible to use all commercial membranes such as the perfluorinated (NAFION®) membranes from DuPont, which are also used in chloralkali electrolysis. The concentration of nitric acid in the suspension can be from 0.5 to 10 mol/l, for example, from 0.5 to 8 mol/l, for example, from 0.5 to 7 mol/l, and for example, from 1 to 5 mol/l. Good results are achieved at a concentration of nitric acid of from 2 to 4 mol/l. The nitric acid can be introduced batchwise or continuously. The continuous introduction of the nitric acid has the advantage that the amount required in each case is automatically matched to the current flowing through the electrolysis and the overall process can be optimally controlled.

In an embodiment of the present invention, the suspension is circulated through the cathode space by means of a pump. In this way, the electrolysis cell and the reservoir can be maintained at different temperatures and the operating life of the cation-exchange membrane can be considerably increased. The temperature in the electrolysis cell can generally be in the range from 20 to 100° C. However, temperatures above 80° C. lead to increased corrosion in the electrolysis cell and thereby reduce its life.

The temperature in the electrolysis cell can, for example, be 20-80° C., for example, 30-70° C.

Corrosion is largely absent when, for example, the temperature in the electrolysis cell is 40-60° C.

The temperature of the suspension in the reservoir should not go below 50° C. in order to achieve a sufficiently high decomposition rate of the ammonium ions. The temperature in the reservoir can, for example, be >60° C., for example, >70° C., for example, >80° C. and for example, >95° C.

An important role is played in the process of the present invention by the current density at which the cathodic reduction of the nitric acid ($HNO_3$) to nitrous acid ($HNO_2$) occurs or at which the electrolysis cell is operated. The reduction of the nitric acid can be carried out at current densities of from 100 to 4000 A/m$^2$. Current densities above 4000 A/m$^2$ greatly restrict the operating performance of the cation-exchange membrane. The reduction can, for example, be carried out at current densities of from 100 to 3000 A/m$^2$, for example, from 300 to 2000 A/m$^2$. In an embodiment, the reduction can be carried out at a current density of from 500 to 1000 A/m$^2$. Long residence times of the cation-exchange membrane are achieved in this range.

After the electrolysis, an aqueous perrhenic acid, which can contain up to 300 ppm of potassium and other impurities, is produced directly according to the present invention in the electrolysis cell. For particular fields of use, for example in catalysts, the quality of the perrhenic acid obtained in this way is already satisfactory and it can be used directly or after subsequent complete reaction with ammonia as prepurified ammonium perrhenate. For other applications, in particular for further processing to give rhenium metal powders by hydrogen reduction of very high-purity ammonium perrhenate, the quality is not yet satisfactory since the potassium content of such perrhenic acid is still too high.

Figure 2:
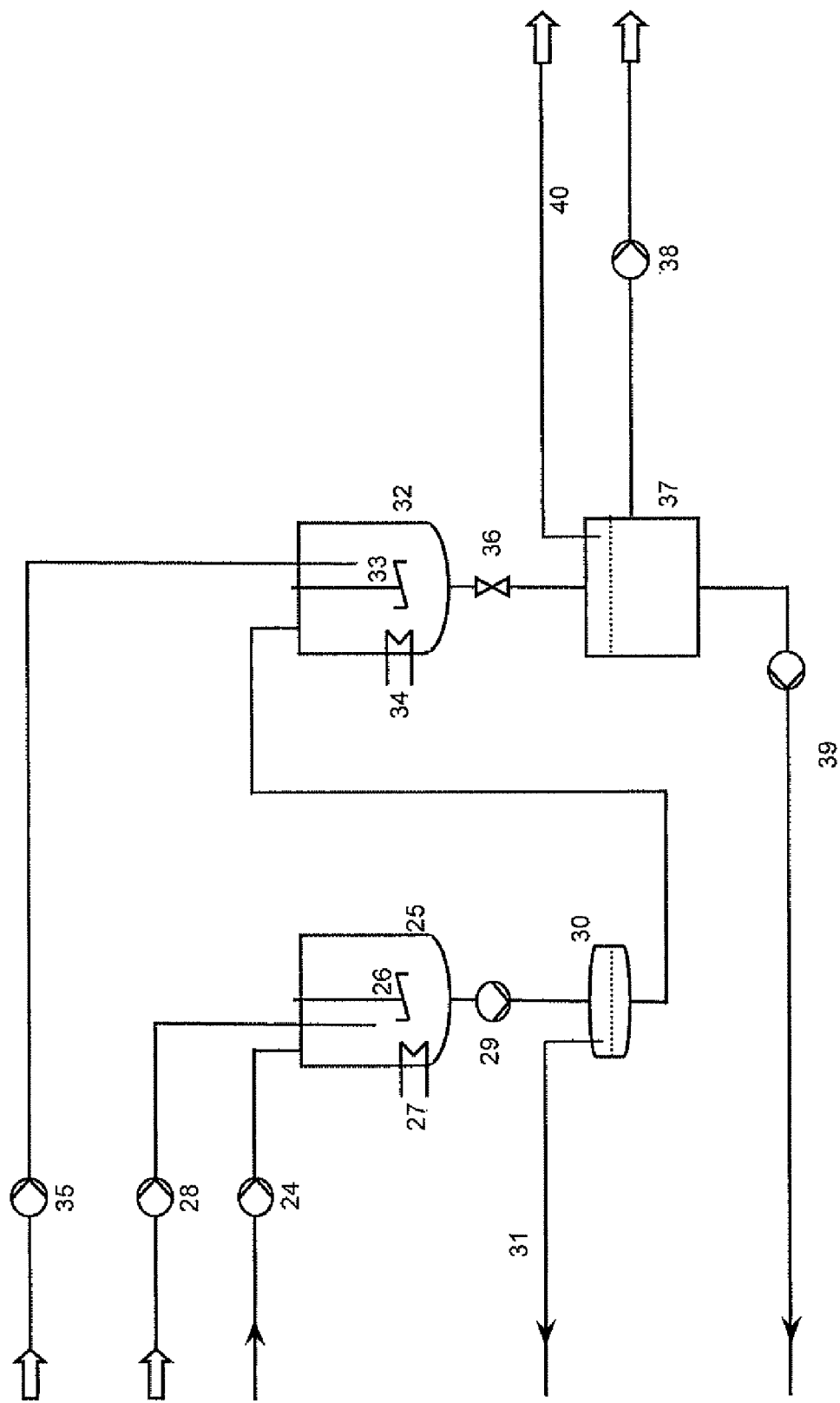
FIG. 2 shows an embodiment of the process of the present invention based on the fractional precipitation of ammonium perrhenate by means of ammonia from the perrhenic acid contaminated with potassium ions.

A further depletion in potassium can, according to the present invention, be carried out particularly advantageously by means of two different processes. An embodiment of the process of the present invention, which is shown in FIG. 2, is based on fractional precipitation of ammonium perrhenate by means of ammonia from the perrhenic acid contaminated with potassium ions. It is known that when ammonium perrhenate is precipitated from a potassium-containing perrhenic acid by means of stoichiometric or superstoichiometric amounts of ammonia, the undesirable potassium ions are incorporated in the crystal lattice of the ammonium perrhenate. This has the consequence that virtually the entire potassium remains in the ammonium perrhenate, even after recrystallization. In view of the solubility product of potassium perrhenate, the interfering potassium ions would actually have to remain completely in the mother liquor in the precipitation of the ammonium perrhenate.

It has surprisingly been found that virtually all of the potassium ions present in the aqueous perrhenic acid can be precipitated and thus removed from the solution by precipitation of only 2-10% of the ammonium perrhenate by addition of the appropriate amount of ammonia ($NH_3$) with stirring.

In an embodiment of the present invention, preprecipitation of, for example, 3-10%, for example, 3-8%, for example, 3-6%, for example, 2-5% and for example, 2-4%, of the total ammonium perrhenate can occur. The ammonium perrhenate fraction remaining after the preprecipitation, which contains 90-98% of the ammonium perrhenate, can be reacted with ammonia to form high-purity ammonium perrhenate.

The ammonia can be introduced into the reaction system as concentrated aqueous ammonia solution (25% strength) or in gaseous form. The ammonia can also be introduced as a mixture of gaseous ammonia and an aqueous ammonia solution. The above-described methods of introduction of the ammonia have the advantage that the reaction volumes can be kept small and the required proportion of the preprecipitation is minimized.

Figure 3:
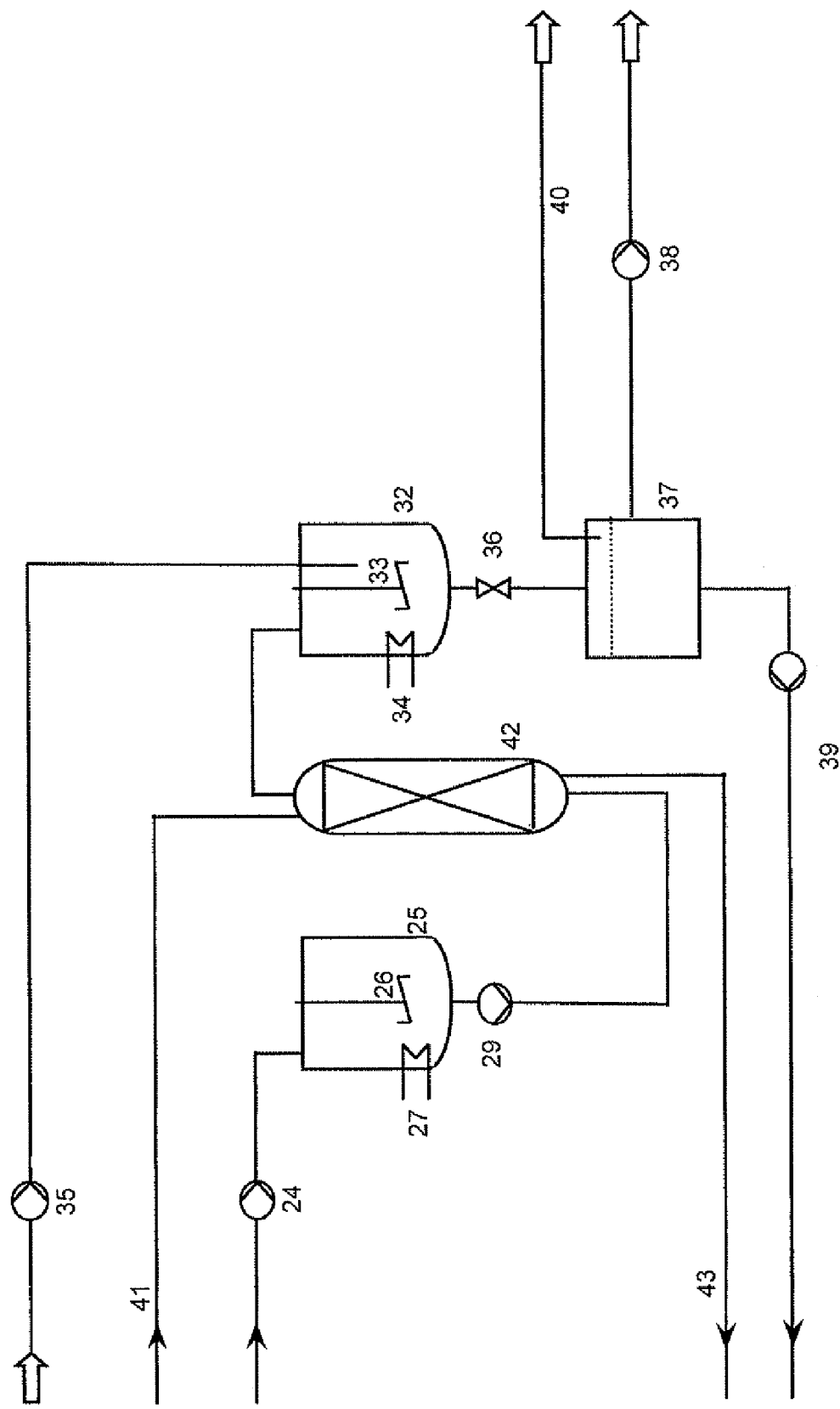
FIG. 3 shows an embodiment of the process of the present invention in which the potassium ions are removed by means of cation exchangers in protenated form from the perrhenic acid which can be obtained in the first step.

In an embodiment of the process of the present invention shown in FIG. 3, the potassium ions are removed by means of cation exchangers in protenated form from the perrhenic acid which can be obtained in the first step. In contrast to the above-described prior art, in which stoichiometric amounts of ammonium ions are removed by means of cation exchangers and dilute perrhenic acid is formed from ammonium perrhenate solutions, only traces of potassium are removed in the process of the present invention. As a result, the very complicated regeneration cycles are reduced to a minimum. After removal of the potassium ions by means of the ion exchanger, the purified perrhenic acid is admixed with an at least stoichiometric amount of ammonia in order to obtain high-purity ammonium perrhenate. An excess of ammonia of from 5 to 20% based on the stoichiometric amount is advantageous in order to ensure quantitative neutralization of the perrhenic acid.

The overall process will be illustrated below with the aid of FIGS. 1 to 3. An important step in the overall process is the conversion of ammonium perrhenate into perrhenic acid, as shown in FIG. 1.

In the reactor (1) equipped with stirrer (2) and heat exchanger (3), a suspension is produced by addition of saturated ammonium perrhenate solution via pump (4) and technical-grade ammonium perrhenate as solid (5) while stirring. Low-solids suspension is pumped via the immersed tube (6) by means of pump (7) through the heat exchanger (8) into the cathode space of an electrolysis cell (10) divided in two by a cation-exchange membrane (9). The catholyte flows back into the reactor (1) via the free overflow (11). A temperature of >50° C. is maintained in the reactor (1) by means of the heat exchanger (3). Before the low-solids suspension is pumped into the cell by means of the pump (7), cooling to ≤80° C. may if appropriate be effected in the heat exchanger (8). The anolyte from the electrolysis cell (10), which consists of perrhenic acid, is pumped by means of pump (13) from a circulation vessel (12) into the anode space of the divided electrolysis cell (10) and flows via the free overflow (14) back into the circulation vessel (12). In the latter, cooling is effected by means of the heat exchanger (15) and the losses caused by decomposition of water and transfer into the cathode space are compensated by addition of deionized water by means of pump (16). After the two circuits have been started up, nitric acid is pumped by means of pump (17) into the reactor (1) and current is made to flow in the electrolysis cell (10) by application of a suitable electric potential. Nitrate is then reduced cathodically to nitrite which reacts with the ammonium ions of the ammonium perrhenate and protons in a comproportionation reaction to form $N_2$ and $H_2O$. The nitrogen produced leaves the system via the offgas line (18). Oxygen is evolved at the anode and leaves the system via the offgas line (19). The protons generated anodically in this way migrate through the cation-exchange membrane, such as a NAFION® membrane, into the cathode space where they are consumed for the cathodic reduction of nitrate. After the electrolysis is complete, the entire catholyte is pumped by means of pump (20) via a small pressure filter (21) into the reservoir (22). The pressure filter (21) serves to separate off, at this point (23), any potassium perrhenate which has precipitated. The perrhenic acid, which may still contain up to 300 ppm or 400-500 ppm of potassium (based on rhenium), is collected in the reservoir (22). This perrhenic acid is passed to further processing by means of pump (24). The further processing of the potassium-containing perrhenic acid to produce high-purity ammonium perrhenate can be carried out in various ways. The purification can, for example be carried out by preprecipitation of the ammonium perrhenate, as shown in FIG. 2. In this process, the potassium-containing perrhenic acid is pumped by means of pump (24) into the preprecipitation reactor (25). The solution is cooled by means of a heat exchanger (27) while stirring (26). While stirring, ammonia is metered in by means of the pump (28) until the desired proportion of ammonium perrhenate has been precipitated. The suspension formed is subsequently pumped by means of pump (29) via a filter (30) into the main reactor (32). The precipitated ammonium perrhenate is recirculated to the reactor (1) via a suitable feed device (31), for example, a feed screw. In the main reactor (32), ammonia is metered in by means of a pump (35) while stirring (33). After addition of the ammonia is complete, the mixture is stirred further and cooled to room temperature by means of the heat exchanger (34). The suspension is subsequently drained via the valve (36) onto the filter (37) which is operated under reduced pressure by means of pump (38). The mother liquor drawn off can be fed via pump (39) to the earlier process stages of rhenium production or recirculated via pump (4) to the reactor (1). The high-purity ammonium perrhenate is taken off from the filter via (40) and, for example, processed further to high-purity Re metal powder by reduction.

In an embodiment, the present invention provides a process for preparing high-purity ammonium perrhenate (FIG. 3) in which an ion exchanger is used. In this process, the potassium-containing perrhenic acid is, after cooling in the reactor (26), conveyed by means of the pump (29) through the ion-exchange column (42) into the reactor (32). The ion-exchange column is filled beforehand via (41) with cation exchanger in the protonated form, so that the potassium ions present in the perrhenic acid are replaced by $H^+$ ions. The perrhenic acid then contains less than 5 ppm of potassium, based on rhenium. The high-purity ammonium perrhenate is then precipitated in the main reactor (32), as described above. When the ion exchanger no longer takes up enough potassium, it is passed via (43) to regeneration using mineral acids.

The present invention also provides an ammonium perrhenate which contains less than 5 ppm of potassium, for example, less than 3 ppm of potassium and, for example, less than 1 ppm of potassium. The ammonium perrhenates of the present invention can have different morphologies in respect of the particle or agglomerate shape, for example, platelet-like, irregularly shaped, rod-like or spheroidal. The ammonium perrhenates according to the present invention are characterized in particular by the spheroidal shape of the crystal agglomerates. The size of the crystal agglomerates can be greater than 10 µm, for example, greater than 20 µm, for example, greater than 30 µm and for example, greater than 50 µm.

Such ammonium perrhenates can be prepared by the above-described process.

The ammonium perrhenate of the present invention is a particularly pure product and is characterized, for example, by a purity of at least 99.999% based on the total mass of the product.

The ammonium perrhenates of the present invention can be used as precursors for the preparation of particularly pure rhenium compounds and rhenium metal. The rhenium metal is particularly suitable as alloying metal for producing superalloys and also for coating rotary X-ray anodes.

The present invention is illustrated by the following examples.

EXAMPLES

Example 1

In the reactor (1) equipped with stirrer (2) and heat exchanger (3), a suspension was produced by addition of 110 kg of saturated ammonium perrhenate solution by means of pump (4) and 150 kg of technical-grade ammonium perrhenate (5) having a potassium content of 1000 ppm while stirring. Low-solids suspension was pumped via the immersed tube (6) by means of pump (7) through the heat exchanger (8) into the cathode space of the electrolysis cell (10) divided in two by a Nafion membrane (9). The catholyte went back into the reactor (1) via the free overflow (11). A temperature of 100° C. was maintained in the reactor (1) by means of the heat exchanger (3). Cooling to 80° C. was effected in the heat exchanger (8). The anolyte from the electrolysis cell (10) comprised 40% of $HReO_4$ and was pumped by means of pump (13) from a circulation vessel (12) into the anode space of the divided electrolysis cell (10) and flowed via the free overflow (14) back into the circulation vessel (12). In the latter, a temperature of 30° C. was maintained by means of the heat exchanger (15). The losses due to decomposition of water and transfer into the cathode space were compensated by addition of deionized water by means of pump (16). After the two circuits had been started up, 705 g/h of nitric acid (50%) were pumped into the reactor (1) by means of the pump (17) and a current of 300 A was made to flow in the electrolysis cell (10) by application of an electric potential of about 4 V. After 103 hours, the electrolysis was stopped and the entire catholyte was pumped by means of pump (20) through a small pressure filter (21) into the reservoir (22). 359 kg of 40% strength perrhenic acid having a potassium content (gK/(gK+gRe)) of 370 ppm were obtained. This perrhenic acid was used for further processing to give high-purity ammonium perrhenate.

Example 2

50 kg of 38% strength perrhenic acid from Example 1 were pumped into the preprecipitation reactor (25) by means of the pump (24). The solution was cooled to 25° C. by means of heat exchanger (27) while stirring (26). While stirring, 0.60 kg of ammonia (25%) was then metered in by means of pump

(28) over a period of 2 minutes. The suspension formed was then pumped immediately by means of pump (29) via the pressure filter (30) into the main reactor (32). There, 5.4 kg of ammonia (25%) were metered in over a period of 1 hour by means of pump (35) while stirring (33). After the addition was complete, the mixture was stirred further until it had been cooled to 25° C. by means of the heat exchanger (34). The suspension was subsequently drained via the valve (36) onto the vacuum filter and filtered and then dried. This gave 18.9 kg of high-purity ammonium perrhenate having a potassium content of 4.9 ppm. The proportion of preprecipitated ammonium perrhenate was 2.2% of the total amount precipitated as solid.

Examples 3-5

Examples 3-5 were carried out by a method analogous to Example 2, with the proportion of preprecipitated ammonium perrhenate being increased in steps. Table 1 below summarizes the parameters and the results of Examples 2 to 5.

TABLE 1

|  | Example 2 | Example 3 | Example 4 | Example 5 |
|---|---|---|---|---|
| stream 24 [kg]: | 50 | 50 | 50 | 50 |
| initial charge of perrhenic acid $HReO_4$ [%]: | 40 | 40 | 40 | 40 |
| K [ppm]: | 370 | 370 | 370 | 370 |
| stream 28 [kg]: | 0.6 | 0.7 | 0.8 | 1.0 |
| preprecipitation by means of ammonia $NH_3$ [%]: | 25 | 25 | 25 | 25 |
| proportion of preprecipitation [%]: | 2 | 4 | 6 | 9 |
| stream 35 [kg]: | 5.4 | 5.3 | 5.1 | 5.0 |
| main precipitation by means of ammonia $NH_3$ [%]: | 25 | 25 | 25 | 25 |
| stream 40 [kg]: | 18.9 | 18.5 | 18.0 | 17.4 |
| product output K [ppm]: | 4.9 | 3 | 2 | <1 |

Example 6

50 kg of 38% strength perrhenic acid from Example 1 were pumped by means of the pump (24) into the preprecipitation reactor (25). The solution was cooled to 25° C. by means of heat exchanger (27) while stirring (26). The cooled acid was subsequently conveyed over a period of 0.5 hour by means of pump (29) through the ion-exchange column (42), which was filled with 1 liter of acidic ion exchanger, into the main reactor (32). There, 6 kg of ammonia (25%) were metered in over a period of 1 hour by means of the pump (35) while stirring (33). The further work-up was carried out as described in Examples 2 to 5. 24 kg of high-purity ammonium perrhenate having a potassium content of 4 ppm were obtained.

Comparative Example 2 kg of ammonium perrhenate having a potassium content of 1000 ppm were firstly decomposed at 500° C. under a nitrogen atmosphere in a tube furnace to give $ReO_2$. The furnace outlet was subsequently connected to a cooled, water-filled receiver and the nitrogen was replaced by oxygen. Perrhenic acid was formed in the receiver and was subsequently reacted with 0.6 kg of ammonia (25%) to form ammonium perrhenate. After filtration and drying, 1.9 kg of ammonium perrhenate were obtained. The potassium content of the ammonium perrhenate prepared in this way was 25 ppm.

The present invention is not limited to embodiments described herein; reference should be had to the appended claims.

The invention claimed is:

1. A process for preparing a pure ammonium perrhenate, the process comprising:
   producing a first aqueous suspension containing an ammonium perrhenate;
   adding a stoichiometric amount of a nitric acid to the first aqueous suspension so as to produce a second suspension;
   introducing the second suspension into a cathode space of an electrolysis cell, wherein the electrolysis cell is divided by a cation-exchange membrane into the cathode space and an anode space;
   cathodically reducing the nitric acid to a nitrous acid in the cathode space by applying an electric potential;
   reacting the nitrous acid with ammonium ions of the ammonium perrhenate so as to form an aqueous perrhenic acid;
   removing potassium ions from the aqueous perrhenic acid; and
   adding at least a stoichiometric amount of ammonia to the aqueous perrhenic acid so as to produce the pure ammonium perrhenate.

2. The process as recited in claim 1, wherein a concentration of the nitric acid in the second aqueous suspension is from 0.5 to 10 mol/liter.

3. The process as recited in claim 1, wherein a concentration of the nitric acid in the second aqueous suspension is from 1 to 5 mol/liter.

4. The process as recited in claim 1, wherein a pump is configured to circulate the second suspension through the cathode space via a reservoir.

5. The process as recited in claim 4, wherein a temperature in the reservoir is >60° C.

6. The process as recited in claim 4, wherein a temperature in the reservoir is >95° C.

7. The process as recited in claim 1, wherein a temperature in the electrolysis cell is 20-100° C.

8. The process as recited in claim 1, wherein a temperature in the electrolysis cell is 40-60° C.

9. The process as recited in claim 1, wherein the cathodically reducing of the nitric acid to the nitrous acid is performed at a current density of from 100 to 4000 A/m$^2$.

10. The process as recited in claim 1, wherein the cathodically reducing of the nitric acid to the nitrous acid is performed at a current density of from 500 to 1000 A/m$^2$.

11. The process as recited in claim 1, wherein the removing of the potassium ions from the aqueous perrhenic acid is performed by adding ammonia while stirring so as to preprecipitate 1 to 10% of the ammonium perrhenate.

12. The process as recited in claim 11, wherein the adding ammonia while stirring is performed so as to preprecipitate 2 to 5% of the ammonium perrhenate.

13. The process as recited in claim 11, wherein the ammonia is added as at least one of an aqueous $NH_3$ solution, as a gas and as a combination of the aqueous $NH_3$ solution and the gas.

14. The process as recited in claim 1, wherein the removing of the potassium ions from the aqueous perrhenic acid is performed by adding a cation exchanger in a protonated form.

* * * * *